United States Patent
Hergeth

(10) Patent No.: US 10,144,348 B2
(45) Date of Patent: Dec. 4, 2018

(54) WARNING UNIT IN A VEHICLE FOR WARNING THE DRIVER WHEN THERE IS AN IMMINENT DANGER

(71) Applicant: Bayerische Motoren Werke Aktiengesellschaft, Munich (DE)

(72) Inventor: Sebastian Hergeth, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 58 days.

(21) Appl. No.: 15/092,665

(22) Filed: Apr. 7, 2016

(65) Prior Publication Data

US 2016/0297358 A1 Oct. 13, 2016

(30) Foreign Application Priority Data

Apr. 8, 2015 (DE) ........................ 10 2015 206 211

(51) Int. Cl.
| | |
|---|---|
| *B60Q 9/00* | (2006.01) |
| *B60H 1/00* | (2006.01) |
| *B60W 50/14* | (2012.01) |
| *G01C 21/36* | (2006.01) |

(52) U.S. Cl.
CPC ........... *B60Q 9/00* (2013.01); *B60H 1/00764* (2013.01); *B60H 1/00871* (2013.01); *B60H 1/00978* (2013.01); *B60Q 9/008* (2013.01); *B60W 50/14* (2013.01); *B60H 1/00821* (2013.01); *B60H 1/00828* (2013.01); *G01C 21/3652* (2013.01)

(58) Field of Classification Search
CPC ......... B60Q 9/00; B60Q 9/008; B60W 50/14; G01C 21/3652; B60H 1/00828; B60H 1/00978; B60H 1/00764; B60H 1/00871; B60H 1/00821
See application file for complete search history.

(56) References Cited

U.S. PATENT DOCUMENTS

| | | | |
|---|---|---|---|
| 5,745,031 A | 4/1998 | Yamamoto | |
| 9,041,542 B2* | 5/2015 | Chang | G08B 21/06 |
| | | | 116/101 |
| 9,679,209 B2* | 6/2017 | Omi | H04N 5/23219 |
| 2007/0244641 A1 | 10/2007 | Altan et al. | |

(Continued)

FOREIGN PATENT DOCUMENTS

| | | |
|---|---|---|
| DE | 11 2007 000 961 T5 | 2/2009 |
| DE | 10 2012 008 660 A1 | 11/2012 |

(Continued)

OTHER PUBLICATIONS

German Search Report issued in counterpart German Application No. 10 2015 206 211.2 dated Oct. 29, 2015 with partial English translation (13 pages).

*Primary Examiner* — Jason Holloway
(74) *Attorney, Agent, or Firm* — Crowell & Moring LLP

(57) ABSTRACT

A warning unit and a correspondingly configured method warns a driver in a vehicle where there is an imminent danger. The warning unit includes a control unit for bringing about a driver message when imminent danger is detected in the surroundings of the vehicle and an actuator system for outputting the driver message. When imminent danger is detected in the surroundings of the vehicle, the control unit outputs a signal for bringing about a flow of air in the direction of the driver.

13 Claims, 2 Drawing Sheets

(56) References Cited

U.S. PATENT DOCUMENTS

| | | | |
|---|---|---|---|
| 2010/0007480 A1* | 1/2010 | Uozumi | A61B 5/18 340/436 |
| 2010/0214087 A1* | 8/2010 | Nakagoshi | A61B 5/18 340/436 |
| 2014/0229075 A1* | 8/2014 | Lopez | B60H 1/0065 701/45 |
| 2015/0203030 A1 | 7/2015 | Knobl et al. | |
| 2016/0009175 A1* | 1/2016 | McNew | H04N 13/0484 340/438 |
| 2016/0075279 A1* | 3/2016 | Takamatsu | B60Q 9/00 701/36 |

FOREIGN PATENT DOCUMENTS

| | | |
|---|---|---|
| DE | 10 2012 215 350 A1 | 3/2014 |
| DE | 10 2013 100 982 A1 | 8/2014 |
| JP | 2014167726 A * | 9/2014 |

* cited by examiner

WARNING UNIT IN A VEHICLE FOR WARNING THE DRIVER WHEN THERE IS AN IMMINENT DANGER

CROSS REFERENCE TO RELATED APPLICATION

This application claims priority under 35 U.S.C. § 119 from German Patent Application No. 10 2015 206 211.2, filed Apr. 8, 2015, the entire disclosure of which is herein expressly incorporated by reference.

BACKGROUND AND SUMMARY OF THE INVENTION

The invention relates to a warning unit in a vehicle for warning the driver when there is an imminent danger.

Prior art has already disclosed a multiplicity of vehicle warning systems which warn the driver by way of acoustic and/or visual warning messages. The latest developments additionally or alternatively attempt also to use other perception channels of the driver by use of warning messages which can be perceived haptically or which are embodied in a vibro-tactile fashion.

DE 10 2013 100 982 A1 discloses a driver assistance device, wherein, in order to warn about dangers, oscillations and vibrations can be generated by at least one component of the vehicle.

Systems which are embodied in a corresponding way are also already known for not only alerting the driver to the danger but also indicating the direction from which the danger arises.

DE 10 2012 215 350 A1, for example, discloses a multi-attention alert steering system for a vehicle with a warning signal output arrangement for outputting haptic, acoustic and visual warning signals to the driver. In addition, the direction of a potential source of danger can be indicated by means of the corresponding output of the warning signals.

Furthermore, DE 10 2012 008 660 A1 discloses a method for warning a driver of an imminent risk of collision, wherein acoustic and/or visual driver warnings, which indicate a direction of the risk of collision to the driver are output as a function of a detected risk of collision.

Owing to the large number of visual, and to a certain extent also acoustic, (warning) messages, resource bottlenecks can occur owing to multiple occupation of the same perception channel, with the result that under certain circumstances the driver cannot perceive all the messages immediately. Some visual warnings or messages are possibly also perceived only later if the driver does not aim his gaze directly in the direction in which the message is generated.

The object of the invention is then to specify an improved warning unit for warning a driver, which warning unit generates a warning message which can be perceived well by the driver and is perceived as hardly being disruptive.

This and other objects are achieved by a warning unit in a vehicle, as well as an associated method, for warning the driver when there is an imminent danger. The warning unit has a control unit for bringing about a driver message when imminent danger is detected in the surroundings of the vehicle, and an actuator system for outputting the driver message. When imminent danger is detected in the surroundings of the vehicle, the control unit outputs a signal for bringing about a flow of air in the direction of the driver.

The invention is based on a basically known warning unit in a vehicle for warning a driver when there is an imminent danger, which warning unit includes a control unit for bringing about a driver message when imminent danger is detected in the surroundings of the vehicle, and an actuator system for outputting the driver message.

The invention is based on the idea of using, for warning the driver, different or new channels with respect to already known (perception) channels, which different or new channels nevertheless ensure that the message is perceived. The object of the invention is also to alert the driver of the motor vehicle to relevant warning messages in a non-intrusive but nevertheless selective and targeted fashion.

The device according to the invention is defined in that when imminent danger is detected in the surroundings of the vehicle, in order to warn the driver, the control unit outputs a signal for bringing about a flow of air in the direction of the driver. As a result of the (unaccustomed) flow of air which is brought about, the driver is to be alerted to a danger in the surroundings of the vehicle, with the result that he can react correspondingly.

Imminent danger can be detected by evaluating the signals from a wide variety of sensors or vehicle systems. A danger can arise for the driver, for example, by virtue of the fact that another road user approaches the driver in an unusual way or the driver approaches another road user or obstacle in a dangerous way. Likewise, a danger can be detected if a lane change which is unintended or can hardly be carried out because of the traffic or departure from the lane is detected. It is therefore possible, for example, for an imminent danger to be detected in the control unit or a second control unit arranged upstream of the control unit on the basis of the signals of the surroundings sensors (radar, lidar, camera, etc.) present in the vehicle. Likewise, the imminent danger can be detected by way of car-to-X communication devices.

An imminent danger can advantageously be detected as a result of a driver assistance system which is present in the vehicle. In this context, the control unit can output the signal for bringing about a flow of air in the direction of the driver in response to a signal of a driver assistance system for detecting imminent dangers in the surroundings of the vehicle, in particular for detecting objects in the blind spot of the vehicle (referred to as blind spot assistant) or behind the vehicle. The control unit can then be part of the relevant driver assistance system or a control unit which is independent of this driver assistance system. The control unit can also be composed of a plurality of control devices which are arranged separately in the vehicle.

The flow of air can be brought about in a variety of ways. In the simplest configuration, the flow of air can be generated by opening a window, as a result of which a flow of air which impinges on the driver is generated in the passenger compartment of the vehicle. The actuator system which generates the flow of air can advantageously also be part of the air-conditioning device of the vehicle, i.e. when a warning is necessary the control unit sends a signal to the air-conditioning device for bringing about the flow of air in the direction of the driver. The flow of air can be brought about by opening predefined directional air flaps and/or switching on the blower or increasing the blower power, with the result that a (generated) flow of air is conducted in the direction of the driver from the directional air flaps or air vent flaps.

Since people are particularly sensitive to air flows in the region of the neck, in particular, in one particularly advantageous configuration of the invention there is provision that the actuator system is part of a neck air-conditioning device with air vent openings in the upper region of the vehicle seat, in particular in the headrest. A gentle jet of air which is generally well perceived by the driver can therefore be generated by the flow of air which is brought about by the control unit by corresponding actuation of the neck air-conditioning device. The air-conditioning device which functions as an actuator system, in particular the neck air-conditioning device which functions as an actuator system, can be actuated here in such a way that when there is imminent danger a jet of air is generated by said device and is directed onto the driver's neck, in particular onto a small region of the driver's neck. Through the punctiform orientation of the jet of air, the jet is perceived even better by the driver as a warning message, as such an actuation of the (neck) air-conditioning device is unusual in the normal operating mode.

The control unit can also advantageously be embodied in such a way that when imminent danger is detected, the control unit outputs a signal for bringing about a directed flow of air in the direction of the driver, and the direction can be predefined in a variable fashion, in particular as a function of the relative position of the imminent danger with respect to the driver or with respect to the vehicle. In other words, a directed jet of air can be brought about which conveys information about the direction in which the danger arises to the driver. If, for example, an imminent danger is detected to the left behind the driver, the jet of air can be arranged in such a way that it impinges on the driver on the rear left-hand half of his neck. If a visual warning display is additionally displayed, for example in the left-hand exterior rear view mirror, owing to imminent danger, the jet of air can also be arranged in such a way that the jet of air impinges on the left-hand half of the driver's body. As a result of his natural reflexes, the driver will direct his orientation in the direction of the jet of air and therefore in the direction of imminent danger or in the direction of the visual indication.

Alternatively or additionally to the predefinition of the direction, when imminent danger is detected, the control unit can output a signal or signal combination for bringing about a temperature-controlled flow of air, that is to say a flow of air with a predefined temperature, and the temperature is variable, in particular can be predefined in a variable fashion as a function of defined parameters. For example, the temperature of the flow of air which is brought about can be predefined as a function of the type of imminent danger, the position of the imminent danger, the supposed consequences of the danger and/or as a function of a passenger-compartment air-conditioning parameter such as, for example, the current passenger-compartment temperature or of the set point temperature of the flow of air which is set before the detection of the imminent danger. As a result of a defined temperature of the flow of air being brought about, the perceptibility of the air flow can be increased and/or additional information relating to the imminent danger can be conveyed to the driver.

Alternatively or additionally to the predefinition of the temperature and/or direction of the flow of air, the control unit can also be configured in such a way that when imminent danger is detected, the control unit outputs a signal or signal combination for bringing about a flow of air at a predefined intensity, and the intensity of the flow of air is variable, in particular can be predefined in a variable fashion as a function of defined parameters. Analogously to the predefinition of the temperature, the intensity of the flow of air which is brought about can be predefined as a function of the type of imminent danger, the position of the imminent danger, the supposed consequences of the danger and/or as a function of a passenger-compartment air-conditioning parameter such as, for example, the current passenger-compartment temperature or the intensity of the flow of air which is set before the detection of the imminent danger. By bringing about a defined intensity of the flow of air, the perceptibility of the flow of air can be increased and/or additional information about the imminent danger can be conveyed to the driver.

A second aspect of the invention is directed to a method for warning a driver in a vehicle when there is an imminent danger, wherein when imminent danger is detected in the surroundings of the vehicle, a driver message is brought about and the driver message is output. When the imminent danger is detected in the surroundings of the vehicle a signal for bringing about a flow of air in the direction of the driver is generated and output.

The above statements with respect to the warning unit according to the invention in accordance with the first aspect of the invention apply in a corresponding way also to the method according to the invention according to the second aspect of the invention.

The method according to the invention and the advantageous refinements thereof can be carried out by way of an implemented algorithm or a corresponding assembly arrangement in one or more control devices provided for this purpose, in particular in a driver assistance system control device and/or an air-conditioning control device.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
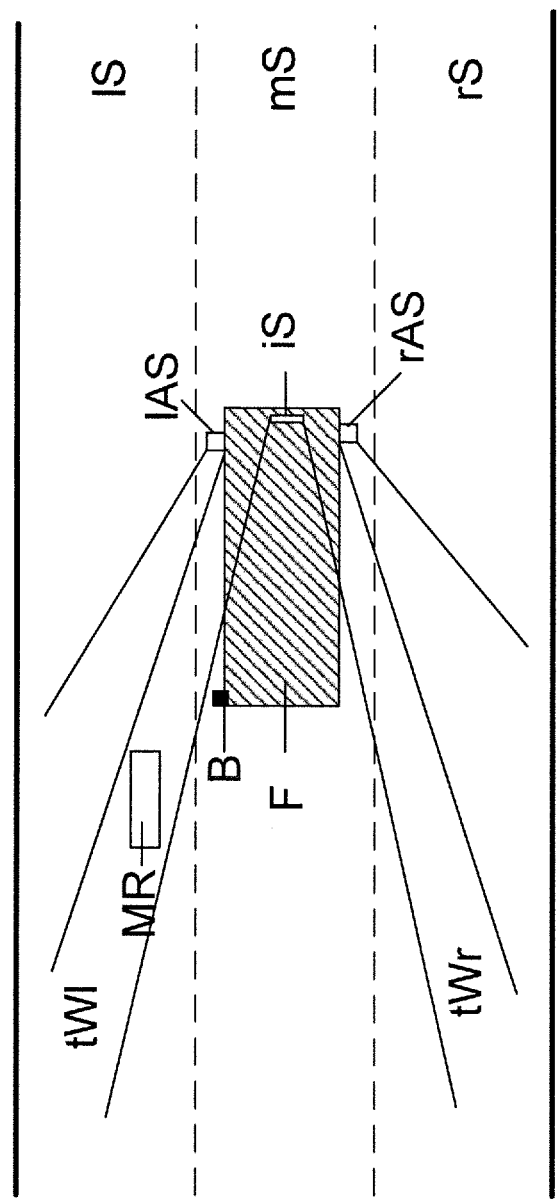
FIG. 1 is a schematic diagram of a traffic situation in which use of a warning unit according to an embodiment of the invention is advantageous.

FIG. 1 shows a traffic situation of a multi-lane road with a left-hand lane 1S, a central or middle lane mS and a right-hand lane rS. On the middle lane mS there is a vehicle F which wishes to change onto the left-hand lane 1S and to do this activates the flashing direction indicator B. The driver of the vehicle F can use the two exterior rear view mirrors 1AS and rAS as well the interior rear view mirror S to monitor the lateral and rear traffic events at least partially, but he cannot see vehicles or other objects which are located in the left-hand blind spot tWl or in the right-hand blind spot tWr. Therefore, in this illustrated traffic situation he cannot see the motorcyclist MR in the left-hand lane 1S. If the driver of the vehicle were now to carry out the signalled lane change onto the left-hand lane 1S (because he does not see the motorcyclist MR), under certain circumstances a collision of the vehicle F with the motorcycle could occur. As a result of a correspondingly embodied warning unit, the driver can be alerted to the imminent danger, with the result that he refrains from changing lanes.

Contemporary so-called blind spot assistants bring about, for example, a warning display in the left-hand exterior rear view mirror 1AS in such a situation, which warning display is generally well perceived. However, if the driver is distracted, the warning display could, under certain circumstances, be perceived too late.

Figure 2:
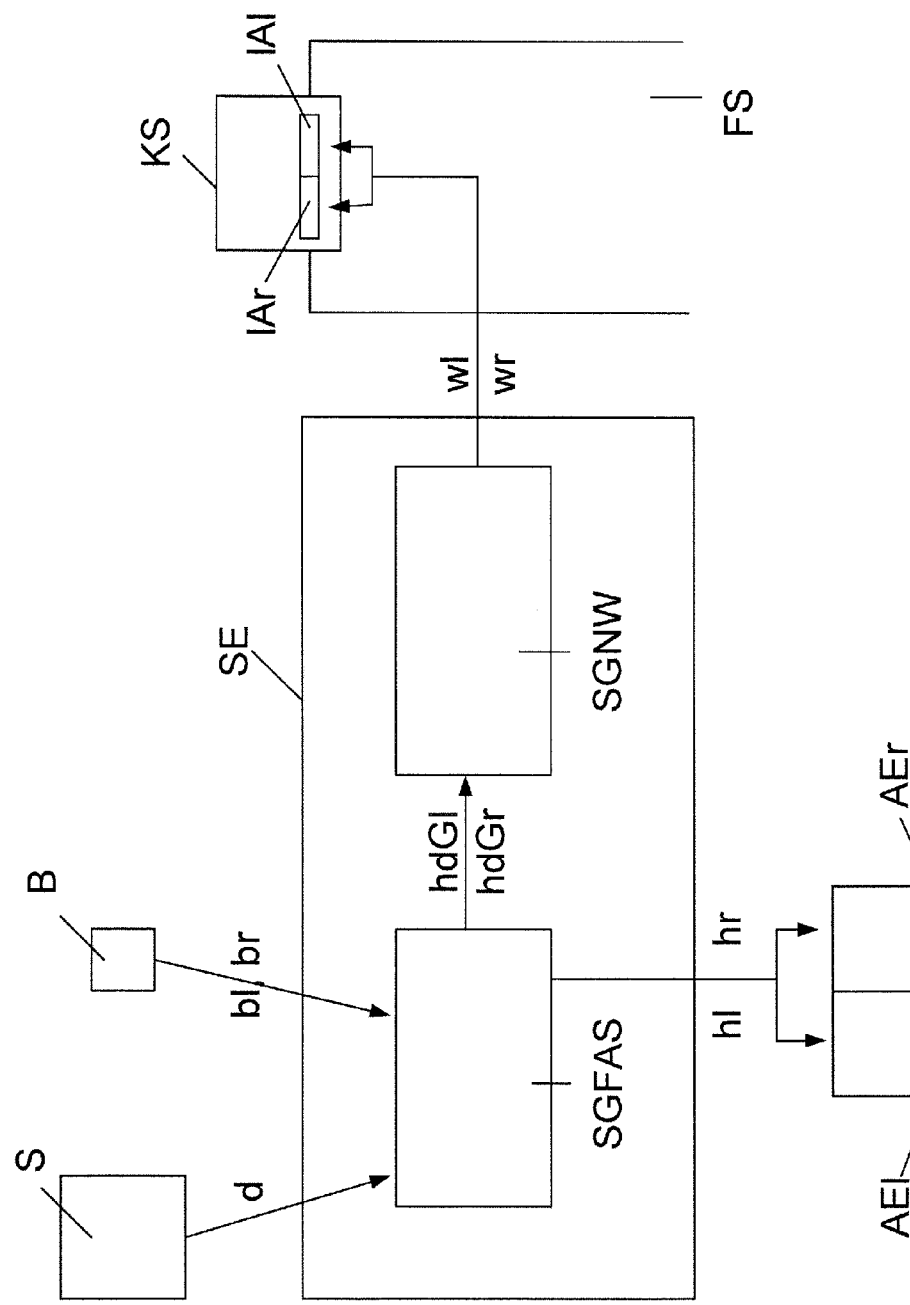
FIG. 2 is an exemplary refinement of a warning unit for warning a driver about an imminent danger.

In order to warn the driver in an optimum way about an imminent danger, as illustrated, for example, in FIG. 1, a warning unit which is illustrated in FIG. 2 can be provided in the vehicle F.

The warning unit which is illustrated in FIG. 2 includes essentially a control unit SE and an actuator system 1Ar and 1Al which is actuated where necessary in such a way that when there is an imminent danger the driver is alerted to it in a selective, non-intrusive but nevertheless sufficient way through the inclusion of a head rest heater or neck warmer.

In this exemplary refinement, the control unit SE has two control devices SGFAS and SGNW, wherein the first control device SGFAS has priority for the responsibility for monitoring the blind spots of the vehicle and for bringing about corresponding measures when a critical situation is detected in the scope of a blind spot assistant which is already known. The second control device SGNW has priority for the responsibility for the air-conditioning of the passenger compartment of the vehicle, in particular for the actuation of the neck warmer in order to control the temperature of the driver's neck in an optimum way.

The control device SGFAS of the blind spot assistant receives signals d of a surroundings detection sensor system S, which can include, for example, a camera and an actuation signal bl or br of a flashing direction indicator B.

On the basis of the signals d of the surroundings detection sensor system S, the control device SGFAS of the blind spot assistant can detect whether a relevant object is located in the blind spot of the vehicle. Such an object is to be evaluated as uncritical as long as the vehicle itself cannot be detected or assumed to be making a movement which dips into the driving lane or path of the detected object. On the basis of the actuation bl or br of the flashing direction indicator, the control device SGFAS determines whether, for example, a change in the movement of the vehicle is to be assumed in the direction of the detected object in the blind spot.

If, for example, an object is detected in the left-hand blind spot of the vehicle and, in addition, an actuation bl of the flashing direction indicator B for indicating a movement of the vehicle to the left is detected, the control device SGFAS detects an imminent danger. In response to this, the control device SGFAS brings about an indication signal hl or hr to a left-hand or right-hand display unit AEl or AEr as a function of the imminent danger, in order to trigger a visual warning in the left-hand or right-hand exterior rear view mirrors. When an imminent danger is detected in the left-hand blind spot of the vehicle, a warning display would therefore be activated in the left-hand exterior rear view mirror.

In parallel with the triggering of the visual warning display (or in an alternative configuration only when it is detected that the visual warning display was supposedly not perceived), the control device SGFAS of the blind spot assistant sends a corresponding request signal or initiation signal hdGl (left-hand) or hdGr (right-hand) to the control device SGNW of the neck warmer to trigger a left-hand or right-hand warning. This control device SGNW subsequently sends a corresponding signal wl or wr (as a function of the position of the imminent danger) to the actuator system of the neck warmer in order to bring about a flow of air through the left-hand air outlet nozzle 1Al or the right-hand air outlet nozzle 1Ar, which are both located in the head rest KS of the driver seat FS. As a result of the flow of air which is generated, the driver senses on his neck a flow of air which is comparable to someone breathing on you. As a result of his natural reflexes, the driver will direct his orientation to the imminent danger or the activated warning display in the exterior rear view mirror by turning his head. The driver's attention is therefore oriented in the direction of the imminent danger or the display in the exterior rear view mirror as a result of the jet of air which is generated.

One development of the warning unit which is not illustrated here but is also possible could consist in the fact that the control unit SE, in this case the control device SGNW of the neck warmer, sends, in addition to the signal or the activation signal wl or wr which is brought about, a further signal for setting the blow power and/or temperature of the jet of air to the actuator system of the neck warmer, with the result that the jet of air exits the air exit nozzles 1Ar or 1Al with a predefined temperature and intensity.

As a result of this warning unit according to the invention, or a warning unit according to the invention which is configured in some other way, and the correspondingly configured method, the driver is therefore alerted in a selective, that is to say targeted, fashion, to the dangerous situation, wherein a transmission of information in this way (jet of air in the direction of the driver) is potentially experienced as hardly disruptive at all. This invention can be implemented in a simple and cost-effective way through the use of a sensor system which is already present, control devices which are present and an actuator system.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A warning unit in a vehicle for warning a driver of an imminent danger, comprising:
   a control unit configured to detect the imminent danger based on signals from a plurality of sensors of the vehicle and/or from a different vehicle via vehicle-to-vehicle communication and provide a driver message when the imminent danger is detected in surroundings of the vehicle;
   an actuator system configured to output the driver message, wherein
   when the imminent danger is detected in the surroundings of the vehicle, the control unit generates a first signal based on the detection of the imminent danger and the actuator system outputs a flow of air in a direction of the driver and the control unit generates a second signal based on the detection of the imminent danger and the actuator system sets the flow of air that is output in the direction of the driver to a predefined temperature, and wherein the predefined temperature is selected based on the imminent danger.

2. The warning unit according to claim 1, wherein the actuator system is part of an air-conditioning system of the vehicle, the air-conditioning system comprising a neck air-conditioning unit having air vent openings in an upper region of a vehicle seat.

3. The warning unit according to claim 2, wherein the air vent openings are arranged in a head rest of the vehicle seat.

4. The warning unit according to claim 1, wherein the control unit outputs the signal that brings about the flow of air in the direction of a neck of the driver.

5. The warning unit according to claim 1, wherein the flow of air in the direction of the driver is variably predefined as a function of a position of the imminent danger.

6. The warning unit according to claim 1, wherein the predefined temperature is a function of defined parameters.

7. The warning unit according to claim 1, wherein the flow of air in the direction of the driver has a predefined intensity, the predefined intensity of the flow of air being variable as a function of defined parameters.

8. The warning unit according to claim 1, wherein
the control unit outputs the signal that brings about the flow of air in the direction of the driver in response to a signal of a driver assistance system that detects imminent danger in the surroundings of the vehicle, and
the driver assistance system is a blind spot driver assistance system.

9. A method of warning a driver in a vehicle of an imminent danger, the method comprising the acts of:
detecting, by a control unit, an imminent danger in surroundings of the vehicle based on signals from a plurality of sensors of the vehicle and/or from a different vehicle via vehicle-to-vehicle communication;
generating, by the control unit, a first signal based on the detection of the imminent danger and providing the first signal to an actuator system of the vehicle and generating a flow of air in a direction of the driver by the actuator system based on the first signal; and
generating, by the control unit, a second signal based on the detection of the imminent danger and providing the second signal to the actuator system of the vehicle and setting the flow of air that is generated in the direction of the driver to a predefined temperature based on the second signal, and
wherein the predefined temperature is selected based on the imminent danger.

10. The method according to claim 9, wherein the imminent danger is an object located in a blind spot of the vehicle.

11. The method according to claim 9, wherein the act of generating the flow of air further comprises directing the flow of air onto a neck region of the driver.

12. The method according to claim 11, wherein the act of directing the flow of air onto the neck region of the driver is carried out by directing the flow of air onto a left-hand side or a right-hand side of the neck region of the driver based on a location of the imminent danger.

13. The warning unit according to claim 1, wherein the predefined temperature is based on one or more of the following: (i) a type of the imminent danger, (ii) a position of the imminent danger, (iii) a potential consequence of the imminent danger, and (iv) a passenger compartment air-conditioning parameter.

* * * * *